(12) United States Patent
Kim et al.

(10) Patent No.: US 9,398,360 B2
(45) Date of Patent: Jul. 19, 2016

(54) AUDIO EXTENSION MODULE

(71) Applicant: LG ELECTRONICS INC., Seoul (KR)

(72) Inventors: Mikyung Kim, Seoul (KR); Heewon Kwon, Seoul (KR); Kangheui Cha, Seoul (KR); Byungmu Huh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/319,169

(22) Filed: Jun. 30, 2014

(65) Prior Publication Data

US 2015/0016650 A1 Jan. 15, 2015

(30) Foreign Application Priority Data

Jul. 9, 2013 (KR) .......................... 10-2013-0080494

(51) Int. Cl.
*H04R 1/02* (2006.01)
*H04N 5/64* (2006.01)
*H04N 21/418* (2011.01)
*H04N 21/81* (2011.01)

(52) U.S. Cl.
CPC ............... *H04R 1/028* (2013.01); *H04N 5/642* (2013.01); *H04N 21/4183* (2013.01); *H04N 21/8106* (2013.01)

(58) Field of Classification Search
None
See application file for complete search history.

(56) References Cited

U.S. PATENT DOCUMENTS

| 8,375,648 B1 | 2/2013 | O'Sullivan .................... 52/71 |
| 2003/0000153 A1 | 1/2003 | Chesser et al. ................. 52/29 |
| 2005/0067540 A1 | 3/2005 | Hsia .............................. 248/200 |
| 2005/0185801 A1 | 8/2005 | McCarty et al. ................ 381/87 |
| 2008/0296448 A1 * | 12/2008 | Eshita ................... F16M 11/10 248/176.3 |
| 2012/0134523 A1 | 5/2012 | Caldes et al. ................. 381/333 |
| 2013/0321715 A1 * | 12/2013 | Millson ............... F16M 11/048 348/739 |

FOREIGN PATENT DOCUMENTS

| GB | 2 453 364 A | 4/2009 |
| WO | WO 00/67476 A1 | 11/2000 |
| WO | WO 2005/041614 A2 | 5/2005 |
| WO | WO 2012/109739 A1 | 8/2012 |
| WO | WO 2012109739 A1 * | 8/2012 .......... F16M 11/048 |

OTHER PUBLICATIONS

European Search Report dated Nov. 12, 2014 issued in Application No. 14 173 522.5.

* cited by examiner

*Primary Examiner* — Wayne Young
*Assistant Examiner* — Mark Fischer
(74) *Attorney, Agent, or Firm* — Ked & Associates, LLP

(57) ABSTRACT

Provided is an audio extension module including: a body that is configured to include a first cover that is covered with an image display device and a second cover that is fixed to a wall; an audio output unit that is configured to be built into the body and that is configured to be formed in such a manner as to receive an audio signal from the image display device and to output the audio signal; and a frame that is configured to cover a gap that is formed between the image display device and the body and that is configured to be removably combined with the body in such a manner as to enclose a border of the body.

16 Claims, 11 Drawing Sheets

AUDIO EXTENSION MODULE

CROSS-REFERENCE TO RELATED APPLICATION

Pursuant to 35 U.S.C. §119(a), this application claims the benefit of earlier filing date and right of priority to Korean Application No. 10-2013-0080494, filed on Jul. 9, 2013, the contents of which is incorporated by reference herein in its entirety.

BACKGROUND OF THE DISCLOSURE

1. Field of the Disclosure

The present disclosure relates to an audio extension module that is capable of extending audio of an image display device.

2. Background of the Disclosure

An image display devices include an apparatus that receives and display broadcasting signals or records and reproduces a moving image and an apparatus that records and reproduces audio data. The image display device is realized, for example, in the form of a television set, a monitor for a computer, a projector, a tablet PC, etc.

The image display device increasingly has multiple functions. In the recent years, the image display device has been realized in the form of a multimedia player equipped with multiple functions including photographing, shooting of video, and gaming, in addition to basic functions of receiving broadcast and playing audio and video files. More recently, the image display device has been realized as a smart device (for example, a smart television).

In order to support and enhance such functions of the image display device, it can be considered to improve the configuration and/or software of the image display device.

The image display device is mounted on a wall or is supported in the upright position by a stand in order to use it. A picture frame-type frame is used in mounting the large-sized image display device to the wall. A method is considered in which use of the picture frame-type frame provides a user of the image display device with convenience when the image display device is in use and makes an external appearance of the image display device more appealing.

SUMMARY OF THE DISCLOSURE

Therefore, an aspect of the detailed description is to provide a picture frame-type frame of an image display device that has a different external appearance from the existing one.

Another aspect of the detailed description is to provide a picture frame-type frame that has a more improved structure and multiple functions.

To achieve these and other advantages and in accordance with the purpose of this specification, as embodied and broadly described herein, there is provided an audio extension module including: a body that is configured to include a first cover that is covered with an image display device and a second cover that is fixed to a wall; an audio output unit that is configured to be built into the body and that is configured to be formed in such a manner as to receive an audio signal from the image display device and to output the audio signal; and a frame that is configured to cover a gap that is formed between the image display device and the body and that is configured to be removably combined with the body in such a manner as to enclose a border of the body.

In the audio extension module, the body may include an opening portion through which a portion of the wall is exposed, in which the image display device is combined with the wall in such a manner as to move relatively with respect to the wall.

In the audio extension module, the audio output unit may include one or more first speakers that are formed in such a manner as to output a low tone and one or more second speakers that are formed in such a manner as to output a high tone.

In the audio extension module, the first speaker may be arranged above or below the opening portion and the second speaker may be arranged to the left of and to the right of the opening portion.

In the audio extension module, at least one portion of the first cover that covers the audio output unit may be made of textile.

In the audio extension module, a hole may be formed in one surface of the body that defines the opening portion, and a conductive wire line that connects between the body and the image display device may pass through the hole.

The audio extension module may further include a combination module that is configured to combine the image display device with the portion of the wall that is exposed through the opening portion, in which the combination module may include a separation unit that is formed in such a manner as to separate the image display device away from the wall.

The audio extension module may further include a tilting unit that is configured to be integrally formed into the separation unit and to move the image display device in an inclined manner.

In the audio extension module, the body and the frame may be removably combined with each other with a magnet.

In the audio extension module, the body may be divided into two or more regions and the image display devices may be arranged in such a manner as to cover the regions that results from the division.

In the audio extension module, the body may further include a signal input and output unit that is configured to be formed in the image display device in such a manner as to transmit and receive an image signal and an audio signal.

In the audio extension module may further include a first wireless communication unit that is configured to be formed in such a manner as to receive the audio signal wirelessly from the image display device.

The audio extension module may further include a second wireless communication unit that is configured to be formed in such a manner as to transmit the image signal and the audios signal wirelessly to the image display device.

In the audio extension module, the body may be combined with the wall in such a manner that the body is able to tilt with respect to the wall.

In the audio extension, the signal input and output unit may be formed in such a manner as to connect to an external apparatus and transfer a signal to the image display device.

In the audio extension module, a power supply unit that is formed in such a manner as to supply electrical power to the image display device may be built into the body.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Figure 1:
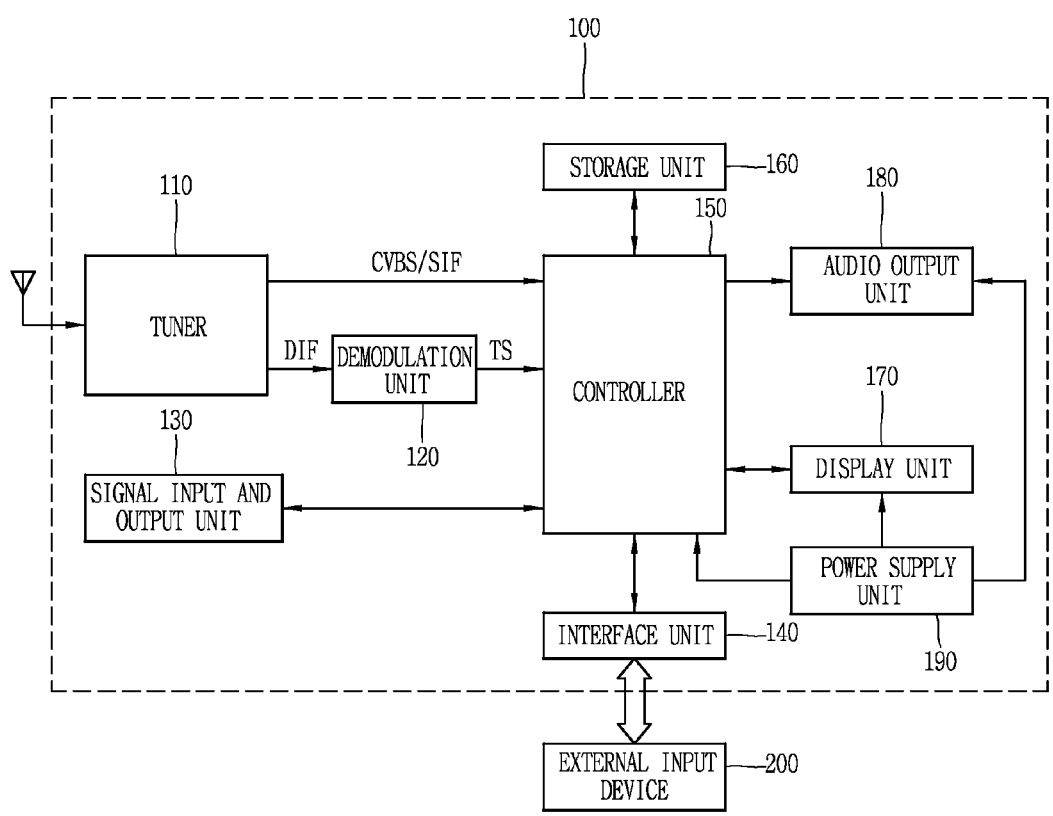
FIG. 1 is a block diagram illustrating an image display device according to the present invention and an external apparatus.

Referring to the accompanying drawings, embodiments according to the present invention are described in detail below in order to provide all information necessary to teach one of ordinary skill in the art to practice the present invention. However, the present invention is not limited to the embodiments described here, but can be realized also as modifications, alterations, or even improvements. What is considered not to be related to the description of the embodiments is not illustrated in the drawing, and similar constituent parts are provided with similar reference numerals throughout the specification for the purpose of providing the clear description.

An image display device referred to in the present specification includes an apparatus that receives and displays radio broadcasts, an apparatus that records and reproduces a moving image, an apparatus that records and reproduces audio signals.

FIG. 1 is a block diagram illustrating an image display device 100 according to the present invention and an external input device 200. The image display device 100 includes a tuner 110, a demodulation unit 120, a signal input and output unit 130, an interface unit 140, a controller 150, a storage unit 160, a display unit 170, an audio output unit 180 and a power supply unit. The external input device 200 may be a separate device from the image display device 100, or may be included in the image display device 100 as a component.

Referring to FIG. 1, the tuner 110 selects a broadcast signal corresponding to a channel selected by the user, from radio frequency (RF) broadcast signals received through an antenna, and converts the selected broadcast signal into an intermediate frequency signal or a baseband video and audio signal. For example, if the RF broadcast signal is a digital broadcast signal, the tuner 110 converts the RF broadcast signal into a digital IF signal DIF. In contrast, if the RF broadcast signal is an analog broadcast signal, the tuner 110 converts the RF broadcast signal into a baseband video and audio signal CVBS/SIF. In this manner, the tuner 110 is a hybrid tuner that processes the digital broadcast signal and the analog broadcast signal.

A digital IF signal DIF, output from the tuner 110, is input into the demodulation unit 120, and an analog baseband video and audio signal CVBS/SIF, output from the tuner 110, is input into the controller 150.

The tuner 110 receives a single carrier RF broadcast signal according to the Advanced Television Systems Committee (ATSC) standards or a multiple-carrier RF broadcast signal according to the Digital Video Broadcasting (DVB) standards.

Although one tuner 110 is illustrated in the drawings, the image display device 100 is not limited to the one tuner and may include the multiple tuners, for example, first and second tuners. In this case, the first tuner receives a first RF broadcast signal corresponding to the broadcast channel selected by the user, and the second tuner receives a second RF broadcast signal corresponding to the already-stored broadcast channel, sequentially or periodically. The second tuner converts the RF broadcast signal into the digital IF signal DIF, or the analog baseband video and audio signal CVBS/SIF, in the same manner as the first tuner.

The demodulation unit 120 receives the digital IF signal DIF that results from the conversion and performs a demodulation operation.

If the digital IF signal DIF, output from the tuner 110, is in the ATSC format, the demodulation unit 120 performs 8-vestigial side band (8-VSB) modulation. The 8-vestigal side band (8-VSB) demodulation results from vestigial side band modulation, which is single carrier amplitude modulation using the National Television System Committee (NTSC) frequency bandwidth. At this time, the demodulation unit 120 performs channel decoding, such as Trellis decoding, de-interleaving, and Reed-Solomon decoding. To that end, the demodulation unit 120 includes a Trellis decoder, a de-interleaver, a Reed-Solomon decoder, and the like.

When the digital IF signal DIF, output from the tuner 110, is in the DVB format, the demodulation unit 120 performs Coded Orthogonal Frequency Division Modulation (COFDMA) modulation. At this time, the demodulation unit 120 performs channel decoding, such as convolution decoding, the de-interleaving, and the Reed-Solomon decoding. To do this, the demodulation unit 120 includes a convolution decoder, the de-interleaver, and the Reed-Solomon decoder.

In this manner, the demodulation unit 120 outputs a stream signal TS after performing the demodulation and the channel decoding. At this time, the stream signal results from multiplexing a video signal, an audio signal, or a data signal. For example, the stream signal TS is an MPEG-2 Transport Stream (TS) that results from multiplexing an MPEG-2 standard video signal, a Dolby AC-3 standard audio signal, and the like. Here, the MPEG-2 TS includes a 4 byte header and a 184 byte payload.

In this manner, the signal, output from the demodulation unit 120 is input into the controller 170 and goes through inverse multiplexing and video/audio signal processing.

The signal input and output unit 130 is by a cable or wirelessly connected to an external apparatus, for example, a digital versatile disk (DVD) player, a Blu-ray disk player, a game apparatus, a camera, a videotape recorder, a notebook computer, a set-top box, a portable device, a smart phone and the like, and performs signal input and output operations. To do this, the signal input and output unit 130 includes an A/V input and output unit for connection to a cable network and a wireless communication unit for connection to a wireless network.

The A/V input and output unit includes an Ethernet port, a USB port, a Composite Video Banking Sync (CVBS) port, a composite port, an S-video port (analog), a Digital Visual Interface (DVI) port, a High Definition Multimedia Interface (HDMI) port, a Mobile High-definition Link (MHL) port, a RGB port, a D-SUB port, an IEEE 1394 port, a SPDIF port, a Liquid HD port, and the like. A digital signal, input through these, is transferred to the controller 150. At this time, an analog signal, input through the CVBS port and the S-VIDEO port, is converted into the digital signal by an analog-to-digital converter (not illustrated) and is transferred to the controller 150.

The wireless communication unit performs wireless Internet access. The wireless communication unit performs wireless Internet access by using wireless communication technologies, such as Wireless LAN (WLAN) (Wi-Fi), Wireless Broadband (Wibro), World Interoperability for Microwave Access (Wimax), and High Speed Downlink Packet Access (HSPPA). In addition, the wireless communication unit can perform short-range communication with a different electronic apparatus. For example, the wireless communication unit performs the short-range communication by using a short-range communication technology, such as Bluetooth, Radio Frequency Identification (RFID), Infrared Data Association (IrDA), Ultra Wideband (UWB), or ZigBee.

The signal input and output unit 130 connects to a predetermined web page over the wireless and cable networks and thus transmits the data to and from the server and additionally receives content or various items of data, for example, the content, such as movies, an advertisement, a game, VOD, and broadcast signals and various items of content-related information, which are provided by a content service provider or a network administer. The signal input and output unit 130 receives firmware update information and update files provided by the network administrator over the cable and wireless networks and receives an application selected by the user among applications that are placed in a public domain.

The signal input and output unit 130 transfers an image signal, an audio signal, and the data signal that are provided by the external apparatus, to the controller 150. In addition, the signal input and output unit 130 transfers the image signal, the audio signal, and the data signal included in various media files stored in an external storage device, such as a memory device and a hard disk driver, to the controller 150. In addition, the signal input and output unit 130 transfers the image signal, the audio signal, and the data signal that are processed by the controller 150, to the external apparatus described above, or the different external apparatus.

For example, the signal input and output unit 130 is connected to the set-top box, for example, a set-top box for Internet Protocol TV (IPTV), through at least one of the ports described above, and performs the signal input and output operation. In addition, the signal input and output unit 130 transfers the image signal, the audio signal, and the data signal, which are processed by the set-up box for the IPTV in such a manner the image signal, the audio signal, and the data signal are available for bidirectional communication, to the controller 150, and transfers the signals processed by the controller 150 back to the set-up box for the IPTV. The IPTV here includes ADSL-TV, VDSL-TV, and FTTH-TV that are different depending on a transmission network. The IPTV includes TV over DSL, Video over DSL, TV over IP (TVIP), Broadband TV (BTV) and the like. In addition, the IPTV includes Internet TV and full browsing TV in which Internet connection is possible.

The digital signal, output from the signal input and output unit 130, also includes the stream signal TS. The stream signal TS, described above, is a signal that results from multiplexing the image signal, the audio signal, and the data signal.

The interface unit 140 transfers the signal, input by the user, to the controller 150, or transfers the signal transferred from the controller 150, to the user.

The interface unit 140 transfers a user input signal, input into a power key, a channel key, a volume key, a setting key and the like, to the controller 150. In addition, the interface unit 140 includes a sensing unit (not illustrated) for sensing a user gesture, a user location, a touch, and the like. To that end, the sensing unit includes a touch sensor, an audio sensor, a location sensor, a motion sensor, a gyro sensor, and the like. In such a case, the interface unit 140 transfers an input signal, input from the sensing unit, to the controller 150, or transmits the signal coming from the controller 150 to the sensing unit.

The interface unit 140 receives an input signal that the user inputs with the external input device 200, for example, the spatial remote controller, to perform power source control, channel selection, screen setting and the like, or transmits the signal processed by the controller 160 to the external input device 200. At this time, the interface unit 140 and the external input device 200 are connected to each other, by a cable or wirelessly.

In addition, the interface unit 140 receives personal information from the external input device 200 and/or receives information on a web server in connection by using the personal information. For example, if the mobile terminal approaches the external input device 200 within a predetermined distance and performs near field communication (NFC), the external input device 200 receives the personal information and others stored in the mobile terminal. The personal information here is information that is necessary to log on with a predetermined account before making a connection to the electronic apparatus or using the service.

The controller 150 controls general operation of the image display device 100. Specifically, the controller 150 generates or outputs a signal for the image or audio output by inversely multiplexing the stream signal TS that is received through the tuner 110, the demodulation unit 120, and/or the signal input and output unit 130 or by processing the inversely-multiplexed signals. For example, the controller 150 controls the tuner 110 in such a manner that the RF broadcast signal corresponding to the channel selected by the user or the already-stored channel is tuned.

The image signal image-processed by the controller 150 is transferred to the display unit 170 and an image corresponding to a resolution image signal is output. The audio signal processed by the controller 150 is transferred to the audio output unit 180 to output a sound. In addition, the image signal and/or the audio signal, which is processed by the controller 150, is input into an output device of the external apparatus through the signal input and output unit 130.

Although not illustrated in the drawings, the controller 150 includes, for example, an inverse multiplexing unit, an image processing unit, an On Screen Display (OSD) generation unit and an audio processing unit, a data processing unit, a channel browsing processing unit and others in order to generate or output the signal for the image or sound output by inversely multiplexing the stream signal TS or by processing the inversely-multiplexed signals.

The inverse multiplexing unit (not illustrated) inversely multiplexes the stream signal TS that is input. For example, if the MPEG-2 stream signal TS is input, the inverse multiplexing unit inversely multiplexes the MPEG-2 stream signal TS into the image signal, the audio signal, and the data signal. The stream signal TS here, as described above, is an output from the tuner 110, the demodulation unit 120, and/or the signal input and output unit 130.

The imaging processing unit (not illustrated) performs image processing, for example, decoding, on the inversely-multiplexed image signal. More specifically, the image processing unit decodes an MPEG-2 standard-encoded image signal by using an MPEG-2 decoder, and decodes an H.264 standard-encoded image signal according to Digital Multimedia Broadcasting (DMB) standard or Digital Video Broadcast-Handheld (DVB-H) standards by using an H.264 decoder. In addition, the image processing unit performs the imaging processing in such a manner that brightness, tint and color of the image signal are adjusted. In addition, the image processing unit performs scaling in such a manner that the inversely-multiplexed image signal can be output on the display unit 170. In this manner, the image signal, which is image-processed by the image processing unit, is transferred to the display unit 170 or transferred to an external output apparatus (not illustrated) through an external output port.

The OSD generation unit (not illustrated) generates an OSD signal depending on a user input or by itself. More specifically, the OSD generation unit generates a signal for displaying various items of information in the form of a graphic or a text on the screen of the display unit 170, for example, based on at least one of the image signal and the data signal or an input signal that is received from the external input device 200. The generated OSD signal includes various data, such as a user interface, various menu screens, a widget, and an icon that are provided on the image display device 100 and a pointer corresponding to a pointing signal that is transmitted from the external input device 200. In addition, the generated OSD signal includes a 2D object or a 3D object.

The controller 150 mixes the OSD signal that is generated by the OSD generation unit described above and the image signal that is image-processed and decoded by the image processing unit. The mixed image signal goes through a frame rate converter (FRC) to change its image frame rate. In addition, the mixed image signal goes through a formatter and is output with its image signal format being changed, or is separated into a 2D image signal and a 3D image signal for 3D image display or is converted from the 2D image signal into the 3D image signal.

The audio processing unit (not illustrated) performs, audio processing, for example, decoding, on the inversely multiplexed audio signal. More specifically, the audio processing unit decodes the MPEG-2 standard-encoded audio signal by using the MPEG-2 decoder, decodes an MPEG 4 Bit Sliced Arithmetic Coding (BSAC) standard-encoded audio signal according to the DMB standards by using an MPEG 4 decoder, and decodes an MPEG 2 advanced audio coded (AAC) standard-encoded audio signal according to satellite DMB standards or the Digital Video Broadcast-Handheld (DVB-H) standards by using an AAC decoder. In addition, the audio processing unit performs base processing, treble processing, and sound volume processing. The audio signal that is processed by the audio processing unit in this manner is transferred to the audio output unit 180, for example, a speaker, or is transferred to an external out device.

The data processing unit (not illustrated) performs data processing, for example, decoding, on the inversely multiplexed audio signal. The data signal here includes electronic program guide (EPG) information including broadcast information, such as a broadcasting-starting time and a broadcasting-ending time of a broadcast program that is broadcast over each channel. The EPG information includes, for example, ATSC-program and System Information Protocol (ATSC-PSIP) in the case of ATSC standards and includes DVB-Service Information (DVB-SI) in the case of DVB. The ATSC-PSIP or the DVB-SI here is included in a header (4 byte) of the MPEG-2 stream signal TS.

The channel browsing processing unit (not illustrated) receives the stream signal TS, output from the demodulation unit 120, or the stream signal, output from the signal input and output TS unit 130, as an input, and extracts an image from it, thereby generating a thumbnail image. The generated thumbnail image, as it is, or as is encoded, is input into the controller 150. In such a case, the controller 150 displays a thumbnail list including the multiple thumbnail images on the display unit 170 by using the thumbnail image that is input. At this time, the thumbnail images in the thumbnail list are displayed on all the regions of the display unit 170, or are displayed one region of the display unit 270 in a manner that enables the thumbnail images to be easily viewable. In addition, the thumbnail images in the thumbnail list are sequentially updated.

On the other hand, the controller 150 performs signal processing on the analog baseband image/audio CVBS/SIF as well. For example, the analog baseband image and audio signal CVBS/SIF, input into the controller 150, is the analog baseband image and audio signal, output from the tuner 110 or the signal input and output unit 130. The controller 150 performs the control, in such a manner that the analog baseband image and audio signal CVBS/SIF that is input is processed, the signal-processed image signal is displayed on the display unit 170, and the signal-processed audio signal is output to the audio output unit 180.

In addition, the controller 150 controls operation of the image display device 100 with a user command, input through the signal input and output unit 130 or the interface unit 140, or with an internal program. More specifically, the controller 150 determines whether or not the external apparatus is connected, depending on the input of the personal information from the external input device 200, based on information on the adjacent external apparatus around the image display device 100, which is received from the signal input and output unit 130 or the interface unit 140, and based on information on a channel over, a frequency at, and a code through which the different external apparatus can be remotely controlled, Then, the controller 250 displays an object indicating the external apparatus being connected, on the display unit 170.

In addition, the controller 150 displays at least one object that is to be displayed on the display unit 170, as a 3D object. For example, in addition to a Web screen (a newspaper, a magazine, and the like) in connection and an electronic program guide (EPG), the object here includes at least one of a menu of various items, a widget, an icon, a still image, a moving image, and a text.

In addition, the controller 150 detects a user gesture by analyzing individually or combinedly an image that is captured by an imaging device (not illustrated), a signal that is detected by a sensing unit (not illustrated), and an input signal that is transmitted by the external input device 200.

In addition, the controller 150 identifies a location of the user, based on the images captured by the capturing unit (not illustrated). For example, the controller 250 measures a distance (an X-axis coordinate) between the user and the image display device 100, and additionally measures an X-axis coordinate and a Y-axis coordinate within the display unit 170, which correspond to the location of the user.

The storage unit 160 stores a program for the signal processing and the control by the controller 150, and stores information on a predetermined broadcast channel through the use of the signal-processed image signal, the audio signal and the data signal, and a channel memory function such as generating a channel map writing. The storage unit 160 includes at least one of the following storage media: a flash memory, a hard disk, a multimedia card micro type, a card type memory (for example, an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

In addition, the storage unit 160 stores IR format key codes for controlling different external apparatuses, and stores IR format key database for multiple external apparatuses.

The image signal, the data signal, and the OSD signal that are processed by the controller 150, or the image signal, the data signal, and a control signal and others that are received from the signal input and output unit 130 or the interface unit 140 are converted into a RGB signal, and a drive signal is generated. Through this process, the resulting image is output to the display unit 170. The display unit 170 is realized in various forms as follows: a plasma display panel (PDP), a liquid crystal display (LCD), a thin film transistor-liquid crystal display (TFT-LCD), an organic light emitting diode (OLED), a flexible display, a 3D display, and an e-ink display.

For example, if the display unit 170 is a 3D display, this is realized as an add-on display type or as a sole display type that enables 3D image viewing. The sole display type is for the display unit 170 to solely realize a 3D image without a separate display, for example, without using eyeglasses. For example, the sole display type is categorized into a lenticular type and a parallax barrier type. In addition, the add-on display type is for the display unit 170 to realize the 3D image by using a 3D viewing device. For example, the add-on display type is categorized into a head-mounted display (HMD) type and an eyeglasses type.

In addition, if the display unit 170 is realized as being equipped with a touch screen-equipped touch screen, the display unit 170 functions as the input device as well as the output device.

The touch sensor is configured in such a manner as to convert a pressure applied to a specific portion of the display unit 170, a change in electrostatic capacitance occurring in a specific portion of the display unit 170, or the like into an electrical signal. The touch sensor is configured in such a manner as to detect the pressure that is applied to the touch sensor at the time of the touch, as well as a position and an area of the touch sensor that a touching object touches on. The touching object here is an object that applies the touch to the touch sensor, and includes for example, a finger, a touch pen or a stylus, a pointer and the like. If the touch input is applied to the touch sensor, a signal(s) corresponding to the touch input is sent to a touch controller. After processing the signal(s), the touch controller transmits the corresponding data to the controller 150. Accordingly, the controller 150 identifies which region of the display unit 170 is touched on.

The audio output unit 180 receives the audio signal processed by the controller 150, for example, a stereo signal or a 5.1 channel signal, as an input, and outputs a sound corresponding to the processed audio signal. To do this, the audio output unit 180 is realized as various types of speakers.

The image display device 100 may includes a capturing unit (which can be referred to as a 'camera', not shown) for capturing a image. The capturing unit may be configured to capture a user, and information on an image captured by the capturing unit may be input to the controller 150. The controller 150 may detect an image, a position, a gesture, an eye change, etc. of a user, based on the captured image. Further, the capturing unit may perform a user's tracking function and a general capturing function using a single camera.

The image display device 100 may further includes a microphone (not shown) to receive an audio command from a user. The microphone (not shown) may include various types of noise removing algorithms to remove noise generated in the course of receiving an external audio signal.

In addition, the image display device 100 includes an image communication unit (not illustrated) that is configured to include the microphone (not illustrated) and the capturing unit. The controller 150 signal-processes the information on the image captured by the capturing unit and information collected by the microphone and transmits the result of the signal processing to an image communication apparatus of the other party through the signal input and output unit 130 or the interface unit 140.

In addition, the image display device 100 may include a user tracking unit (not shown) that is configured to include the microphone (not illustrated) and the capturing unit. The controller 150 may recognize a position of a user's eyes based on an image captured by the capturing unit, and detect an eye change due to movement of a user's two eyes. The controller 150 may acquire information on a user's eyes, based on a signal received from a user tracking unit (not shown).

A power supply unit 190 supplies electric power throughout the image display device 100. Specifically, the power supply unit supplies electric power to the controller 150 realized in the System-On-Chip (SOC) form, the display unit 170 for displaying the image, and the audio output unit 180 for outputting audio.

To do this, the power supply unit 190 includes a converter (not illustrated) that converts DC power into AC power. On the other hand, for example, if the display unit 170 is realizes as a liquid crystal panel including multiple backlight lamps, the power supply unit further includes an inverter (not illustrated) in which a PWM operation is possible for brightness variability and dimming drive.

The external input device 200 is connected to the interface unit 140 by a cable or wirelessly and transmits the input signal that is generated according to the user input, to the interface unit 140. The external input device 200 includes a remote controller (for example, the spatial remote controller), a mouse, a keyboard, a wheel, and the like. The remote controller transmits the input signal to the interface unit 140 by using the communication technology such as Bluetooth, RF, Infrared Data Association (IrDA), Ultra Wideband (UWB), or ZigBee. If the external input device 200 is realized, specifically, as the spatial remote controller, the external input device 200 generates the input signal by detecting a movement of the main body.

On the other hand, the image display device 100 is realized as a fixed-type digital broadcast receiver or a mobile digital broadcast receiver.

If the image display device 100 is realized as the fixed type digital broadcast receiver, the image display device 100 is realized in such a manner as to receive at least one of the following broadcast types: digital broadcast to which to apply an ATSC type (8-VSB type) that uses a single carrier, digital broadcast to which to apply a ground wave DVB-T type (COFDM type) that uses multiple carriers, and digital broadcast in which to apply an ISDB-T type (BST-OFDM type) digital broadcast that allows for the use of different broadcast channel depending on a user authority.

If the image display device 100 is realized as the mobile digital broadcast receiver, the image display device 100 is realized in such a manner as to receive at least one of the following broadcast types: digital broadcast to which to apply a ground wave DMB type, digital broadcast to which to apply a satellite DMB type, digital broadcast to which to apply an ATSC-M/H type, digital broadcast to which to apply a Digital Video Broadcast-Handheld (DVB-H) type, and digital broadcast to which to apply a Media Forward Link-Only type.

On the other hand, the image display device 100 is realized as the digital broadcast receiver for cable communication, satellite communication or IPTV. In addition, the image display device 100 described above is applied to the mobile terminal as well. The mobile terminal includes a mobile phone, a smart phone, a laptop computer, a digital-broadcast-dedicated terminal, a personal digital assistant (PDA), a portable multimedia player (PMP), a navigation system, a slate PC, a tablet PC, an ultrabook and the like.

The image display device, when used as the mobile terminal, further includes the wireless communication unit in addition to the configuration described above. The wireless communication unit enables wireless communication between the mobile terminal and a wireless communication system or between the mobile terminal and a network within which the mobile terminal is located.

To this end, the wireless communication unit includes at least one of a broadcast receiving module, a mobile communication module, a wireless Internet module, a short-range communication module and a positional information module.

The broadcast receiving module receives a broadcast signal and/or broadcast related information from a broadcast administrative server over a broadcast channel.

The broadcast channel here includes a satellite channel, a ground wave channel and the like. In addition, the broadcast administrative server means a server that generates and transmits the broadcast signal and/or the broadcast-related information or a server that receives the generated broadcast signal and/or the generated broadcast-related information and transmits them to the mobile terminal. The broadcast signal here includes not only a TV broadcast signal, a radio broadcast signal, and a data broadcast signal, but also a broadcast signal in the form of a combination of the TV broadcast signal or the radio broadcast signal and the data signal.

The broadcast-related information means broadcast-channel-related information, a broadcast program or a broadcast service provider. The broadcast-related information is provided over a mobile communication network. In addition, the broadcast-related information comes in various forms. For example, the broadcast-related information comes in the form of an electronic program guide in Digital Multimedia Broadcasting (DMB), or an electronic service guide in Digital Video Broadcast-Handheld (DVB-H).

The broadcast receiving module receives the digital broadcast signal by using the following TV standards: Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management system (MBBMS), and Integrated Services Digital Broadcast-Terrestrial (ISDB-T). Of course, the broadcast receiving module is configured in such a manner that it is suitable not only for a digital broadcasting system described above, but also for other broadcasting systems.

The broadcast signal and/or the broadcast-related information that are received through the broadcast receiving module are stored in the memory.

The mobile communication module transmits a wireless signal to and from at least one of a base station an external terminal, and a server over a mobile communication network. The wireless signal includes an audio call signal, a video telephone call signal or various forms of data involved in the transmitting and receiving of a text/multimedia message.

The mobile communication module is configured to realize a videotelephony mode and an audio telephony mode. The videotelephony mode refers to a mode in which the user is engaged in an audio conversation with real-time viewing of the other party's image being enabled, and the audio telephony mode refers to a mode in which the user is engaged in the audio conversation with the real-time viewing of the other party's image being disabled.

The mobile communication module is configured to transmit and receive at least one of audio and video to realize the videotelephony mode and the audio telephony mode. The wireless Internet module is a module for wireless Internet access and is built into or provided independently of the mobile terminal. To provide the wireless Internet access, Wireless Internet technologies are used such as Wireless LAN (WLAN), Wireless Fidelity (WiFi) Direct, (Digital Living Network Alliance (DLNA), Wireless broadband (Wibro), World Interoperability for Microwave Access (Wimax), High Speed Downlink Packet Access (HSDPA), GSM, CDMA, WCDMA, and Long Term Evolution (LTE).

The short-range communication module refers to a module for short-range communication. To provide the short-range communication, short-range communication network technologies are used such as Bluetooth, Radio Frequency Identification (REID), Infrared Data Association (IrDA), Ultra Wideband (UWB), ZigBee, Near Field Communication (NFC), and WiFi Direct.

The positional information module is a module for obtaining a location of the mobile terminal and its typical example is a Global Position System (GPS) module or a WiFi (Wireless Fidelity (WiFi) module.

Figure 2:
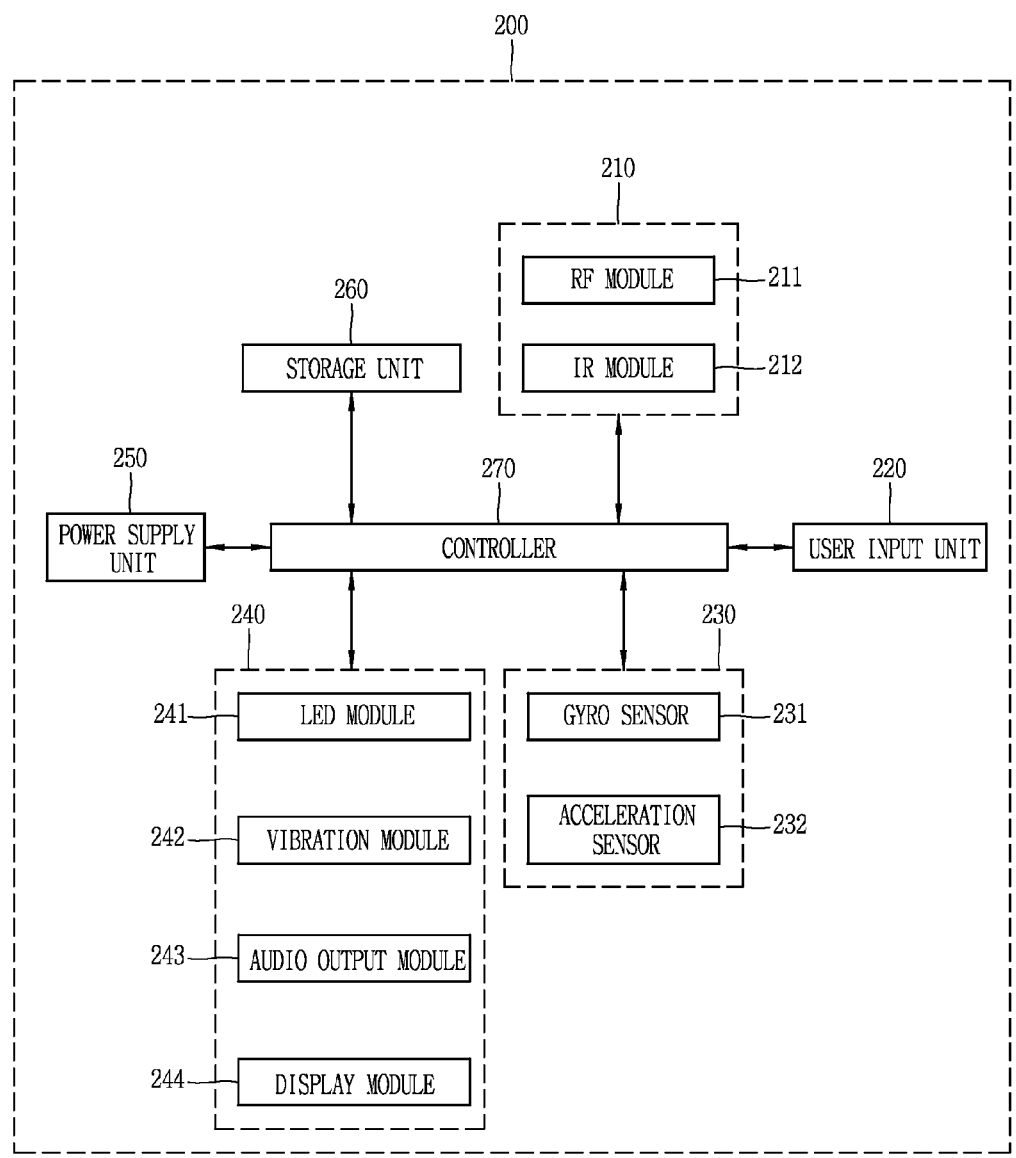
FIG. 2 is a block diagram illustrating the external input apparatus in FIG. 1 in detail.

FIG. 2 is a block diagram illustrating in detail the external input device 200 in FIG. 1. The external input device 200 is configured to include a wireless communication unit 210, a user input unit 220, a sensing unit 230, an output unit 240, a power supply unit 250, a storage unit 260 and a controller 270.

Referring to FIG. 2, the wireless communication unit 210 transmits a signal to and from the image display device 100. To that end, the wireless communication unit 210 includes an RF module 211 and the IR module 212. The RF module 211 transmits the signal transmit to and from the interface unit 140 of the image display device 100 according to RF communication standards. The IR module 212 transmits the signal to and from the interface unit 140 of the image display device 100 according to IR communication standards. For example, the wireless communication unit 210 transmits a signal including information on a movement of the external input device 200 to the image display device 100 through the RF module 211.

On the other hand, the external input device 200 further includes an NFC module (not illustrated) for a short-range magnetic field communication with the predetermined external apparatus. Through the short-range magnetic field communication with the external apparatus, the external input device 200 receives personal information and information on a Web server that is accessed with the personal information and transmits the received information to the image display device 100 through the RF module 211 or the IR module 212.

In addition, the external input device 200 transmits the signal to the interface unit 140 of the image display device 100 by using the communication technology such as Bluetooth, Infrared Data Association (IrDA), Ultra Wideband (UWB), ZigBee), and short-range magnetic field communication (NFC).

The external input device 200 receives the image, the audio, or the data signal that is output from the interface unit 140 of the image display device 100. Then, based on the image, the audio, or the data signal that is received, the external input device 200 displays it on the image display device 100 or outputs it as audio.

In addition, the external input device 200 receives from the adjacent external apparatus information on the different external apparatus and information on the channel over, the frequency at, and the code through which the different external apparatus can be remotely controlled. Based on such information on the different external apparatus, the external input device 200 assigns the channel, the frequency, or the code to the corresponding external apparatus and performs remote control.

The user input unit 220 includes an input unit such as a keypad, a key button, a touch screen, a scroll key, and a jog key. The user operates the user input unit 220 to input a control command associated with the image display device 100. The user inputs such a control command, for example, by pushing down the key button of the user input unit 220. In addition, for example, if the user input unit 220 is equipped with the touch screen, the user inputs the control command by touching on a soft key of the touch screen.

The user input unit 220 includes, for example, an okay key, a menu key, a direction control key, a channel tuning key, a volume adjustment key, a return key (back key), and a home key. The okay key (not illustrated) is used to select a menu or an item. The menu key (not illustrated) is used to display a predetermined menu. The direction control key is used to move a pointer or an indicator displayed on the display unit 170 of the image display device 100, upward, downward, leftward, and rightward. In addition, the channel tuning key (not illustrated) is used to tuning in on a specific channel. The volume adjustment key (not illustrated) is used to adjust the volume in such a manner as to make it be down low or up high. In addition, the return key (not illustrated) is used to move back to the previous screen. The home key (not illustrated) is used to move to a home screen.

The okay key may be configured to additionally have a scrolling function. To that end, the okay key is configured in such a manner as to take the wheel key form. That is, the user can push on the okay key upward and downward or leftward and rightward to select the corresponding menu or item. Also, the user can rotate the wheel forward and backward to scroll through the screen output on the display unit 170 of the image display device 100 or switch it to the next list page. For example, if one region of a screen that has to be output in its entirety is actually output to the display unit 170, the user can scroll the wheel of the okay key to search for a different region of the screen that he/she wants. Thus, a region of the screen that has not been output to the display unit 170 is output to the display unit 170. In another example, if the list page is displayed on the display unit 170, the user can scroll the wheel of the okay key to display the page that precedes or follows the current page currently displayed on the display unit 170.

Channel up or down may be performed in correspondence to a rotation degree of a wheel, using the scroll function of the okay key. Likewise, volume up or down may be performed in correspondence to a rotation degree of a wheel.

In addition, a separate key can be provided to perform the scrolling function that is separated from the okay key.

The sensing unit 230 includes a gyro sensor 231 and an acceleration sensor 232. The gyro sensor 231 senses a spatial movement of the external input device 200 in terms of an X-axis, a Y-axis, and a Z-axis. The acceleration sensor 232 senses a moving speed of the external input device 200.

In addition, the sensing unit 230 further includes a distance measurement sensor to sense a distance from the display unit 170.

The output unit 240 outputs information that depends on operation of the user input unit 220 and information corresponding to a transmission signal of the image display device 100. The user recognizes an operation state of the user input unit 220 or a control state of the image display device 100 through the output unit 240. The output unit 240 includes an LED module 241, a vibration module 242, an audio output module 243, and a display module 244. The LED module 241 emits light, the vibration module 242 generates vibration, an audio output module 243 outputs sound, and a display module 244 displays an image, in response to the operation of the user input unit 220 or a signal transmitted and received through the wireless communication unit 210.

The power supply unit 250 supplies electric power to various electronic elements of the external input device 200. If the external input device 200 is not moved for a predetermined time, the power supply unit 250 stops supplying the electric power to reduce power consumption. When a predetermined key is operated, the power supply unit 250 resumes the supplying of the electric power.

The storage unit 260 stores various programs, applications, and frequency bandwidth information that are associated with the control and the operation of the external input device 200. In addition, the storage unit 260 stores IR format key codes for controlling the different external apparatuses with an IR signal, and stores IR format key database for the multiple external apparatuses.

The controller 270 generally controls what is associated with the control of the external input device 200. The controller 270 transmits a signal corresponding to the operation of the predetermined key of the user input unit 220 to the image display device 100 through the wireless communication unit 210. In addition, the controller 270 transmits the signal corresponding to the movement of the external input device 200 that is sensed by the sensing unit 230 to the image display device 100 through the wireless communication unit 210. The image display device 100 calculates coordinates of the pointer corresponding to the movement of the external input device 200.

Figure 3:
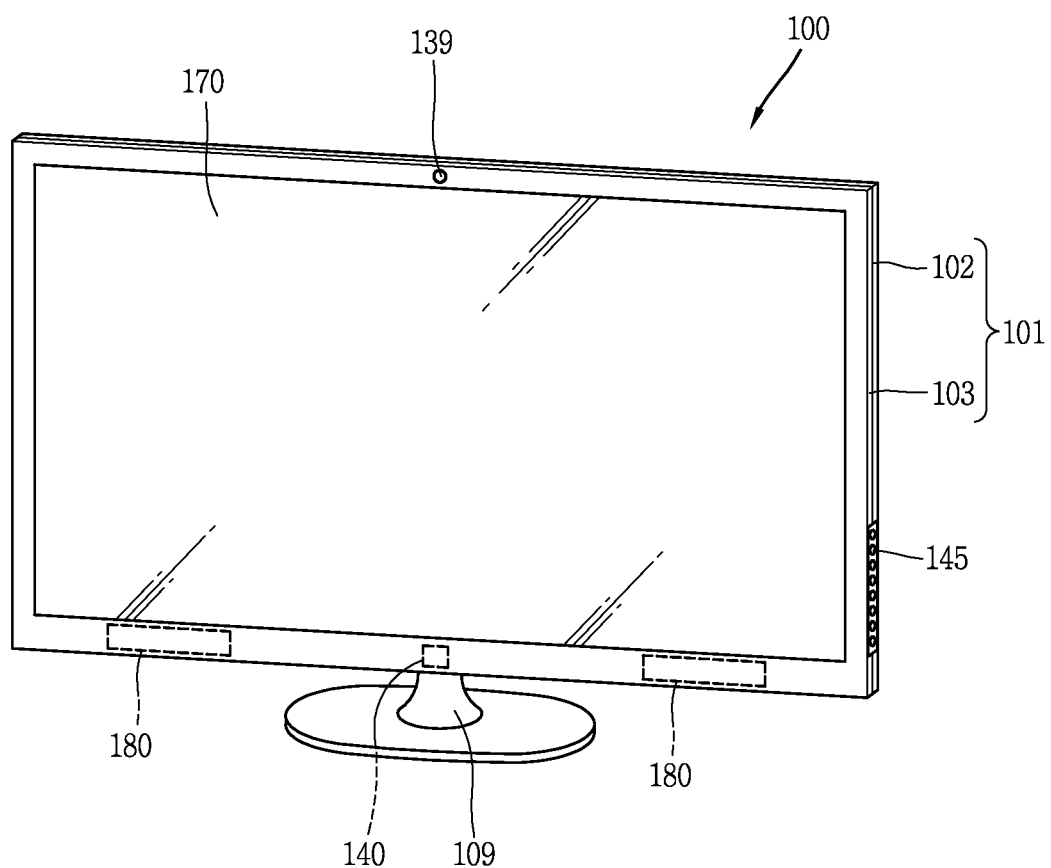
FIG. 3 is a perspective diagram of the image display device according to an embodiment of the present invention, when viewed from the front.

FIG. 3 is a perspective diagram of an image display device 100 according to one embodiment of the present invention, when viewed from the front.

The image display device 100 according to the present invention includes a main body 101 that makes up the external appearance thereof. A case (a casing, a housing, a cover and the like) that makes up the external appearance of the main body 101 are configured from a front case 102 and a rear case 103. Various electronic components are built into a space formed between the front case 102 and the rear case 103.

The main body is held stationary by a support 109 resting on a flat surface.

The cases are formed of synthetic resin, in which injection molding is applied, or are formed of a metal material, such as stainless steel (STS) or titanium (Ti).

A display unit 170 is arranged in the front case 102. The display unit 170 is formed in such a manner as to occupy most of a main surface (a front surface) of the image display device 100.

The front case 102 is configured to have the shape of a tetragonal band with a given width or is configured to have the shape of a tetragonal plate that covers the entire front surface of the display unit 170. In the former case, an edge of the front surface of the display unit 170 to which an image is not output is sheltered, and an edge portion of the display unit 170 is prevented from being damaged by external force. In the latter case, the front case 102 is plate-shaped and is made of transparent material that allows light to pass through. Therefore, the front case 102 is a plastic panel that is formed by injecting resin, a transparent material, using an injection compression molding technique, or the front case 102 is made of compressed tempered glass. Then, an edge of the front case 102 covers an edge portion of the display unit 170 that is surrounded by an opaque film layer or a coating layer and thus does not allow light to pass through.

A signal input and output unit 130, an audio output unit 180, or an interface unit 140 is formed on the front case 102 or the rear case 103. Then, the multiple signal input and output units 130, the multiple audio output units 180, or the multiple interface units 140 may be formed. At this point, one of the multiple signal input and output units 130, one of the multiple audio output units 180 or one of the interface units 140 is formed on the front case 102, and a different one of the multiple signal input and output units 130, a different one of the multiple audio output units 180 or a different one of the interface units 140 is formed on the rear case 103, respectively.

Then, a photographing unit 139 is formed on the main body 101. The photographing unit 139 is formed on the main body 101 in such a manner that the photographing unit 139 can rotate or pop up. The photographing unit 139 processes an image frame, such as a still image or a moving image, that is obtained by an image sensor in an image communication mode or in a photographing mode. The processed image frame is displayed on the display unit 170. Then, the processed image frame is stored in a storage unit or is transmitted through the signal input and output unit 130 to the outside. Two or more of the photographing unit 139 are provided depending on a usage environment.

Image information on the user is obtained through the photographing unit 139, and along with a microphone, the photographing unit 139 makes up the image communication unit.

A user input unit 145 is formed on one lateral surface of the main body 101. The user input unit 145 is operated to input a command for controlling operation of the image display device 100, and includes multiple operation portions. The operation portions are also collectively referred to as an operation unit, and whatever gives the user a feeling of tactile contact during operation may be adopted as the operation portions. Examples of the operation portions include a power on/off key, a channel key, a volume key, a setting key, and so on.

Figure 4:
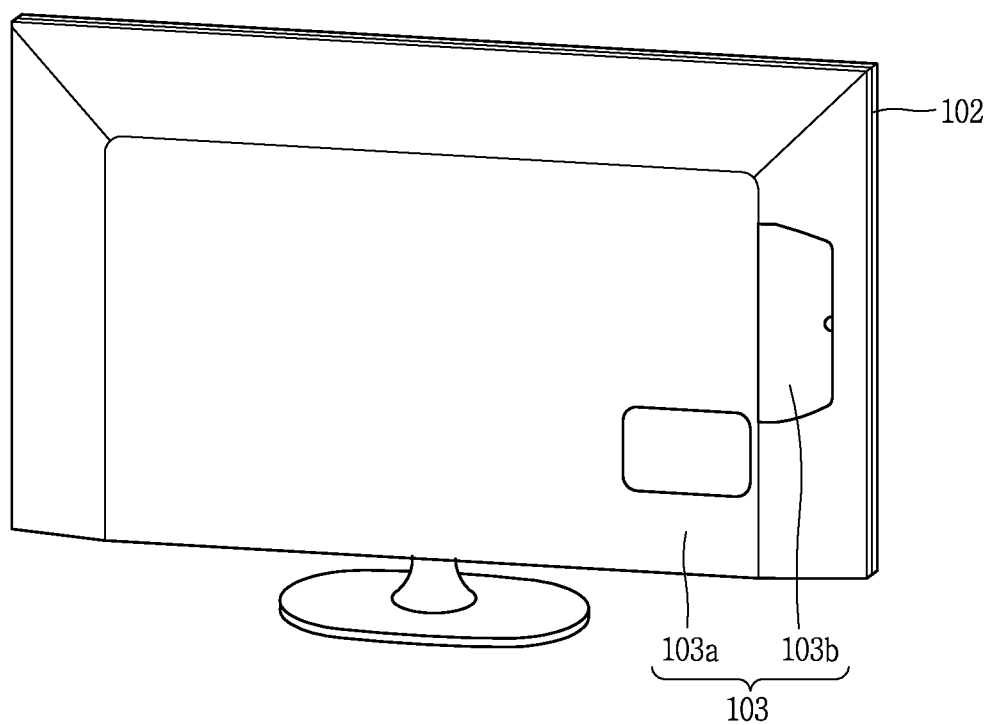
FIG. 4 is a perspective diagram of the image display device according to the embodiment of the present invention, when viewed from the rear.

FIG. 4 is a perspective diagram of the image display device 100 according to one embodiment of the present invention, when viewed from the rear.

The rear case 103 is formed in such a manner as to form an external appearance of the rear surface of the image display device 100. The rear case 103 is formed in such a manner as to cover the entire rear surface of the image display device 100 or to cover most of the rear surface with one portion thereof being excluded.

The rear case 103 includes one or more opening portions (not illustrated), and the signal input and output unit 130 is exposed through an opening portion. The signal input and output unit 130 includes an Ethernet port, a USB port, a Composite Video Banking Sync (CVBS) port, a composite port, an S-video port (analog), a Digital Visual Interface (DVI) port, a High Definition Multimedia Interface (HDMI) port, a Mobile High-definition Link (MHL) port, an RGB port, a D-SUB port, an IEEE 1394 port, an SPDIF port, a Liquid HD port, other video or audio ports, sockets for accommodating a removable card, a wired or wireless communication ports, and so on.

In addition, a power supply terminal is exposed through the different opening portion. Electrical power is supplied from an external power source through the power supply terminal to devices within the image display device 100.

The rear case 103 includes a first member 103a that corresponds to the main surface thereof and a second member 103b that is coupled to the first member 103a in such a manner that it can rotate with respect to the first member 103a. At this point, the first member 103a includes the opening portion, and the second member 103b is connected to the first member 103a in such a manner as to open and close the opening portion.

The middle portion of the first member 103a is formed in such a manner as to have a flat surface whose curvature is close to zero, and a border portion other than the middle portion is formed in such a manner as to have a curved surface whose curvature is uniform.

The opening portion may be formed in the middle portion and may be formed in the border portion. If the opening portion is formed in the border portion, the second member 103b may be connected to the first member 103a in such a manner as to open and close the opening portion.

Figure 5:
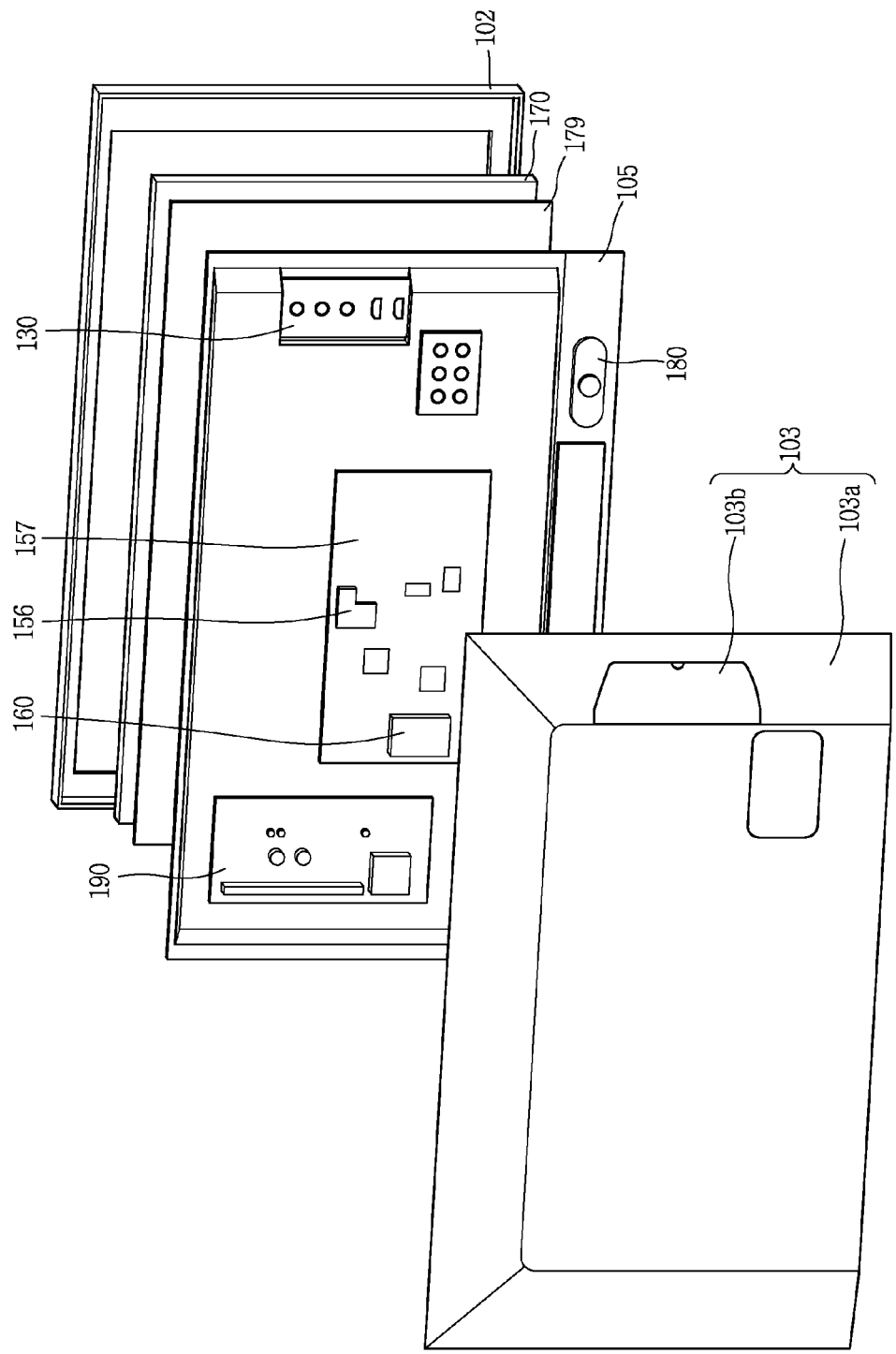
FIG. 5 is a perspective exploded diagram of the image display device illustrated in FIG. 4.

FIG. 5 is a perspective exploded diagram of the image display device 100 illustrated in FIG. 4.

Referring to FIG. 5, the image display device 100 includes the front case 102, the display unit 170, a heat dissipation member 179, a middle case 105 (or a frame), and the rear case 103.

The display unit 170 is realized, in hardware, as a display module, and according to its type, the display module further includes a backlight unit in addition to a display panel.

As one example, the display module includes the display panel and the backlight unit. In this case, the display panel is a portion on which the image is realized. A polarizing plate is placed in front of and in back of the rear surface, and multiple substrates are interposed between the polarizing plates. One of the multiple substrates is also referred to as a TFT array substrate. Multiple scan lines and multiple data lines intersect in a matrix shape and this defines multiple pixels. Then, a thin film transistor (TFT) that can turn on and off a signal is provided in each of the multiple pixels, and a pixel electrode that is connected to each of the thin film transistors is positioned in each of the multiple pixels. Then, a different one of the multiple substrates is also referred to as a color filter substrate. In the different one are provided Red (R), green (G) and blue (B) color filters that correspond to the multiple pixels, respectively, and a black matrix that surrounds the color filters and thus distinguishes between the scan lines and the data lines and non-display elements such as the thin film transistor. Then, a gate drive unit and a data drive unit that generate a drive signal for driving the display panel provided in the edge of the display panel.

In addition, from bottom to top, the backlight unit includes a circuit board layer that includes a PCB, multiple sources that are mounted on the circuit board layer, a reflection layer that is formed on the upper surface of the circuit board layer, a pattern metal reflection layer Z (PMR) that is away from the reflection layer and is placed on the upper surfaces f the light sources and a diffusion layer that is placed on the PMR. At this point, the light source is one among a light emitting diode (LED) chip and a diode package including at least the one diode chip.

The heat dissipation member 179 is formed in such a manner that heat generated in the display module is dissipated to the outside. The heat dissipation member 179 is arranged in such a manner that it comes into contact with the rear surface of the display module. The heat dissipation member 179 is formed in such a manner as to include at least one among a heat dissipation plate, a heat dissipation sheet, thermally conductive bonding agent, a heat dissipation gel, a heat dissipation paint, and a phase change material. Silicone-based or carbon-based composite materials are used for the heat dissipation plate and the heat dissipation sheet, and a metal material with high thermal conductivity is used such as copper.

The middle case 105 that is formed in such a manner to support the inside of the image display device 100 is formed on the rear surface of the heat dissipation member 179. In addition, the middle case 105 are formed of synthetic resin, in which the injection molding is applied. Alternatively, the middle case 105 may be configured as a frame formed of a metal material, such as stainless steel (STS) or titanium (Ti).

A drive unit 155 is formed on the rear surface of the middle case 105. The drive unit 155 is combined with the middle case 105, or is combined with the middle case 105 in such a manner that a cover of the drive unit 155 covers the drive unit 155. A drive unit 155 includes a circuit board 157 and a drive controller 156.

At this point, the drive controller 156 includes a timing controller, and the timing controller is formed in such a manner as to adjust operation timing for each drive circuit of the display panel. The circuit board 157 is formed in such a manner that one or more microcomputer-type chips are mounted on the circuit board 157, an the microcomputer-type chips make up a portion of a controller. As one example, one of the microcomputer-type chip is a portion that transfers a V sync signal, a H sync signal, and an RGB resolution signal to the timing controller.

Then, a storage unit 160 is mounted, in the shape of a hard disk, on the circuit board 157.

In addition, electrical power is supplied from the external power source to a power supply unit 190, and the power supply unit 190 supplies electrical power to each of the devices (for example the display panel or the backlight unit) within the image display device 100.

Various ports that make up the signal input and output unit 130 are formed in such a manner that they are electrically connected to the circuit board 157. To do this, the various ports are formed in a separate circuit board, and are electrically connected to the circuit board 157 that makes up the controller.

The rear case 103 is formed in such a manner as to cover the rear surface of the main body 101. The rear case 103 is combined with the front case 102 or is combined with the middle case 105.

Figure 6:
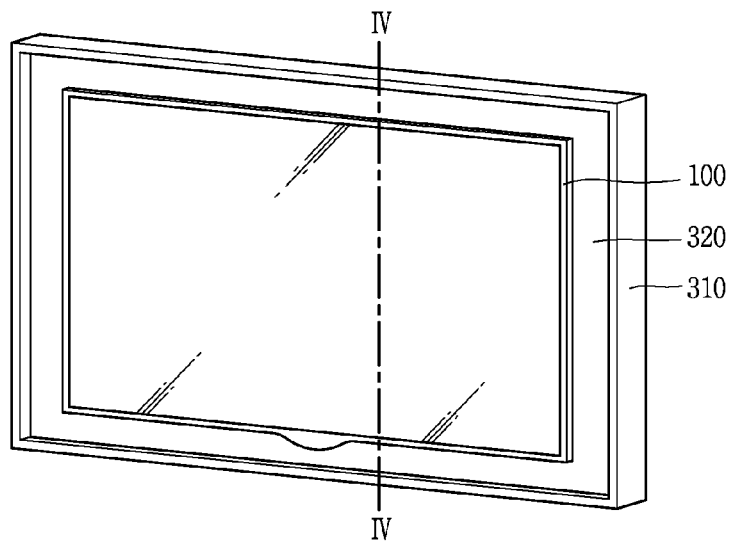
FIG. 6 is a diagram illustrating a state where an audio extension module according to the embodiment of the present invention and the image display device are combined with each other.
Figure 7:
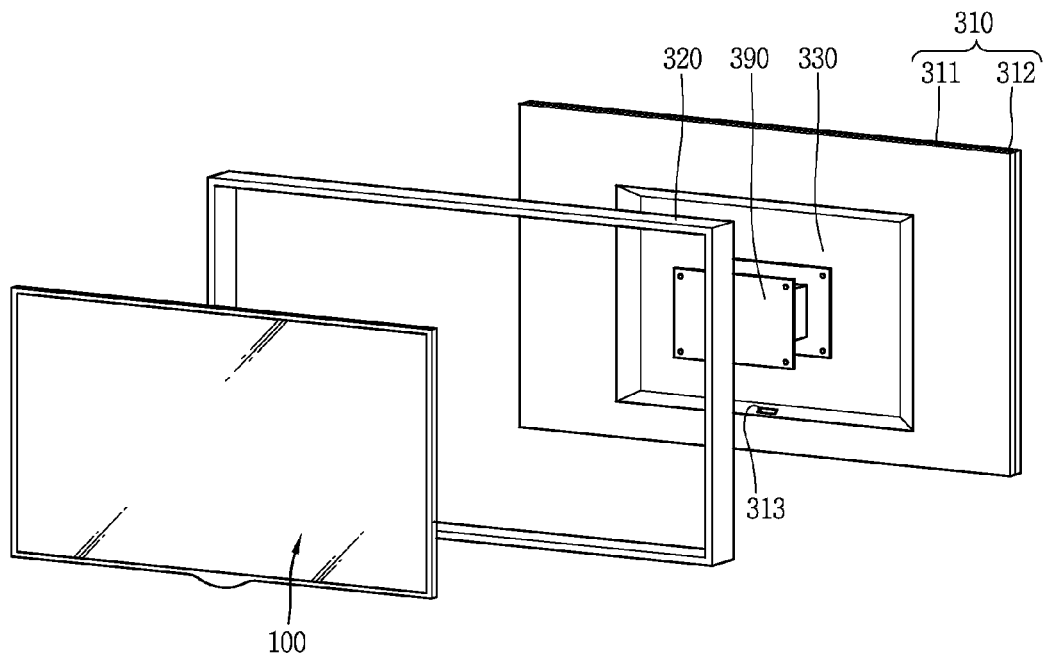
FIG. 7 is a perspective exploded diagram of the audio extension module according to the embodiment of the present invention.
Figure 8:
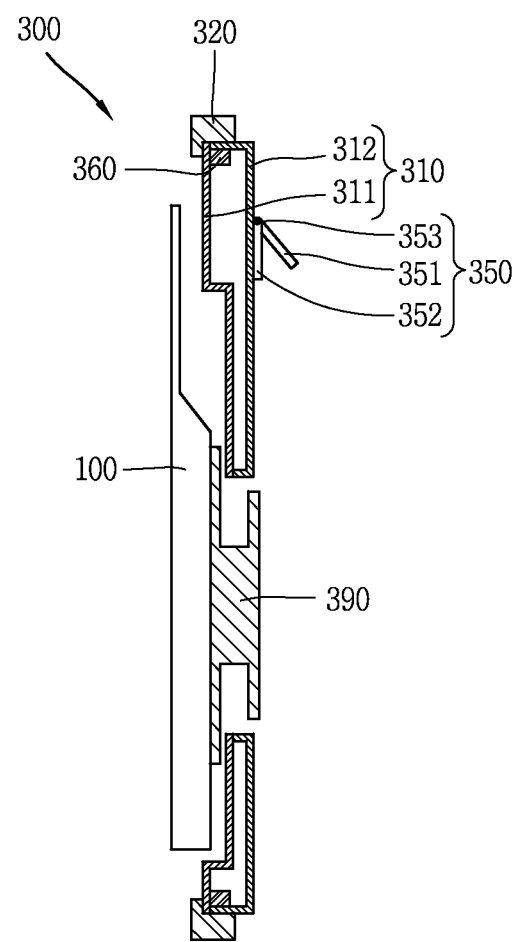
FIG. 8 is a cross-sectional diagram taken along a line IV-IV in FIG. 6.

FIG. 6 is a diagram illustrating a state where an audio extension module according to an embodiment of the present invention and the image display device are combined with each other. FIG. 7 is a perspective exploded diagram of the audio extension module according to the embodiment of the present invention. FIG. 8 is a cross-sectional diagram taken along a line IV-IV in FIG. 6.

The image display device 100 is installed in such a manner that it is mounted on the wall. Referring to FIG. 6, an audio extension module 300 according to the embodiment of the present invention is arranged in such a manner that when the image display device 100 is fixed to the wall, the audio extension module 300 is covered with the image display device 100. The audio extension module 300 is fixed to the wall. Alternatively, the audio extension module 300 may be fixed to the image display device 100.

The audio extension module 300 is formed in the shape of a picture frame. At this point, the audio extension module 300 decorates the wall, along with the image display device 100.

Referring to FIG. 7, the audio extension module 300 includes a body 310 that includes first and second covers 311 and 312 that forms the external appearance thereof. The first cover 311 is formed in such a manner that it is covered with the image display device 100, and the second cover 312 is fixed to the wall.

An audio output unit 370 (refer to FIG. 11) is built into the body 310. The audio output unit 370 is formed in such a manner that an audio signal is received from the image display device 100 and is output, resulting in audio output of the image display device 100 being amplified.

Referring to FIG. 7 and FIG. 8, a frame 320 is removably combined with the body 310. The frame 320 is combined with the body in such a manner as to enclose a border of the body 310. The multiple frames 320 are provided in such a manner as to form the different external appearances. The user selectively combines the frame 320 to the body 310 in order to change the external appearance of the audio extension module 300. As one example, a first frame is a frame with the classical external appearance, and a second frame is a frame with the modern external appearance. The user can change the external appearance of the audio extension module 300 by exchanging between the frames 320 that are different in designs.

Referring to FIG. 8, a magnet 360 is formed in the body 310. The frame 320 is removably combined with the body 310 with the magnet 360. The magnet 360 may be formed on the frame 320.

Unlike what is illustrated in FIG. 8, a groove or protrusion may be formed in the body 310, and a protrusion or a groove may be formed in the frame 320. The body 310 and the frame 320 are combined with each other, by inserting the protrusion in the body 310 or the frame 320 into the groove in the frame 320 or the body 310.

The body 310 includes an opening portion 330 in such a manner that one portion of the wall is exposed. A combination module 390 is arranged in the opening portion 330. The combination module 390 is formed in such a manner that the image display device 100 is moved respectively with respect to the wall. The combination module 390 combines the image display device 100 with the wall. The combination module 390 is described below referring to FIG. 14 to FIG. 16.

Referring to FIG. 8, the body 310 is combined with the wall with a hinge unit 350 in such a manner that it can tilt with respect to the wall. The hinge unit 350 includes a first member 351 that is combined with the wall and a second member 352 that is combined with the image display device 100. The first member 351 and the second member 352 are combined with each other with a spindle 353 that pierces through the first member 351 and the second member 352.

Figure 9:
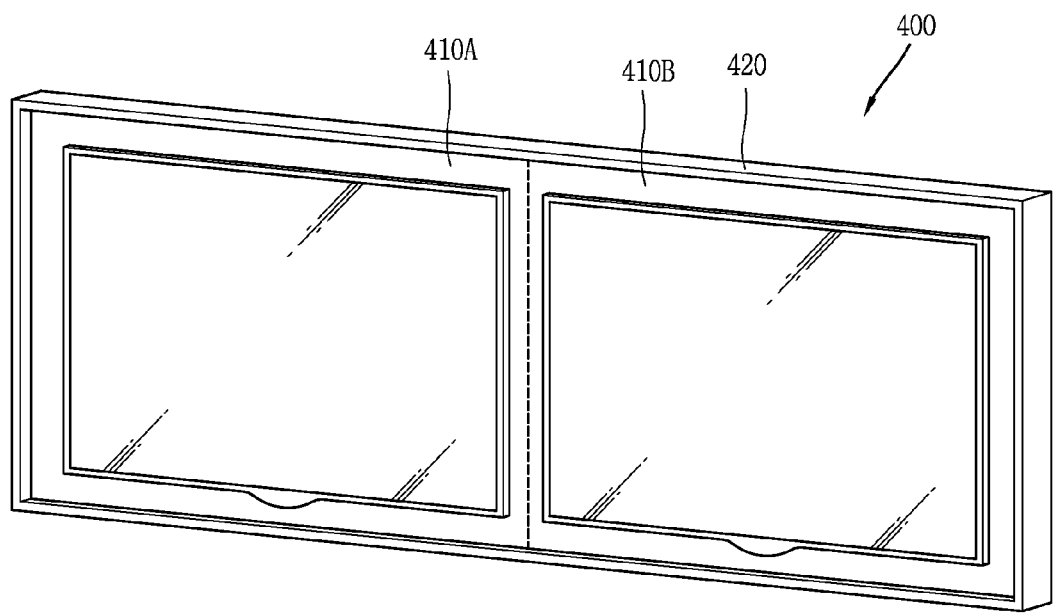
FIG. 9 is a diagram illustrating a state where the audio extension module according to another embodiment of the present invention and the image display device are combined with each other.

FIG. 9 is a diagram illustrating a state where an audio extension module 400 according to another embodiment of the present invention and the image display device 100 are combined with each other.

The audio extension module 400 is formed in such a manner that it is covered with the two or more image display device 100. At this point, the body is divided into two or more regions 410A and 410B, and the multiple image display devices 100 are arranged in such a manner as that they cover the regions that result from the division, respectively.

Figure 10:
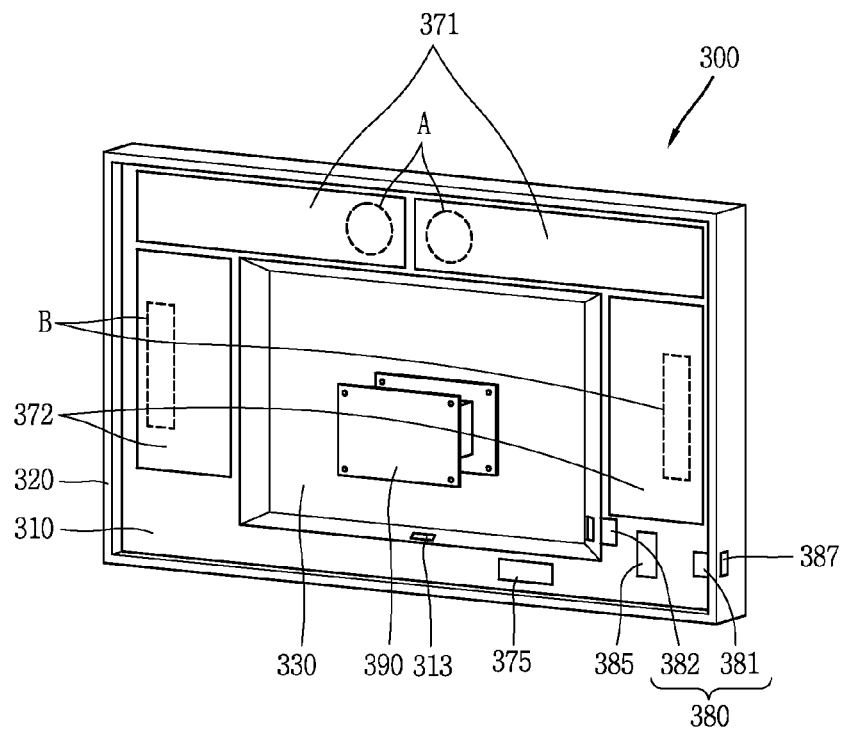
FIG. 10 is a diagram of the audio extension module according to the embodiment of the present invention.
Figure 11:
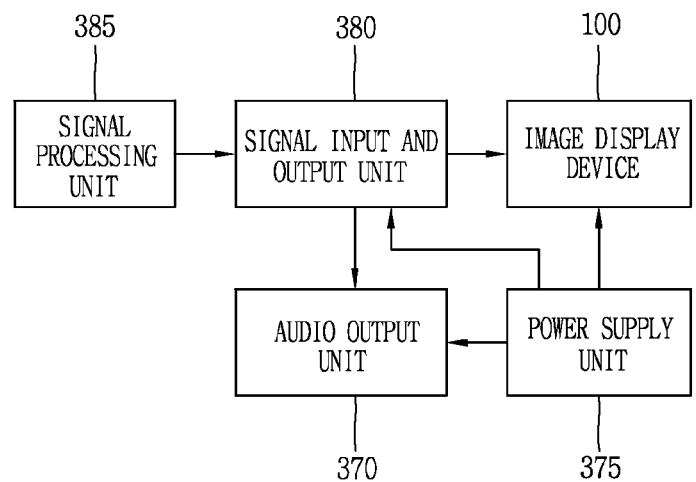
FIG. 11 is a block diagram of the audio extension module illustrated in FIG. 10.

FIG. 10 is a diagram of the audio extension module 300 according to the embodiment of the present invention. FIG. 11 is a block diagram of the audio extension module 300 illustrated in FIG. 10.

An audio output unit 370 is formed in such a manner as to include multiple speakers 371 and 372. The audio output unit 370 includes the first and second speakers 371 and 372. The first speaker 371 is formed in such a manner as to output a low tone, and the second speaker 372 is formed in such a manner as to output a high tone. At this point, the multiple first speakers 371 and the multiple speakers 372 may be formed. The first speaker 371 is a woofer. Accordingly, 2.2 channel speakers are realized.

As illustrated in FIG. 10, the multiple first speakers 371 are formed. The multiple first speakers 371 are formed above the opening portion 330. Alternatively, the first speaker 371 are formed below the opening portion 330. At this point, the multiple second speakers 372 are to the left of and to the right of the opening portion 330, respectively, with the opening portion 330 in between.

Because the speakers are built into the body 310, it is required that portions A and B of the first cover 311 that covers the speakers should be made of a textile in order to allow sound to output. The textile that covers the first cover 311 are formed in such a manner as to have a given aperture ratio or above. The entire first cover 311 is made of textile, in which case the portions A and B of the textile are formed in such a manner as to have an aperture ratio higher than the other portions.

Referring to FIG. 10, a hole 313 is formed in the body 310. Conductive wire lines that are connected to a signal input and output unit 380 or a power supply terminal of the audio extension module 300 are connected through the hole 313 to the image display device 100. At least one of the conductive wire lines connects the image display device 100 and the body 310 through the hole 313. The audio output unit 370 receives the audio signal over the conductive wire line that connects between the image display device 100 and the body 310.

Referring to FIG. 10, the body 310 includes a power supply unit 375. The power supply unit 375 is formed in such a manner as to supply electrical power to the audio output unit 370. Then, the power supply unit 375 supplies electrical power not only to the signal input and output unit 380 and a signal processing unit 385, but also to the power supply unit 190 of the image display device 100.

In addition, the body 310 includes an amplifier that is formed in such a manner as to increase output power of audio signals.

In this manner, some of the devices that are built into the image display device 100 are formed in the audio extension module 300, and thus the image display device 100 are formed in a slimmer manner. In addition, materials associated with heat sink or cooling devices within the image display device 100 are arranged in the audio extension module 300, and this solves problems caused by the heat generation.

Referring to FIG. 10 and FIG. 11, the audio extension module 300 includes the power supply unit 375 and the signal input and output unit 380.

The signal input and output unit 380 is formed in such a manner as to transmit and receive an image signal and an audio signal to and from the image display device 100. As one example, the signal input and output unit 380 transmits the image signal and the audio signal to the image display device 100, receives the audio signal from the image display device 100, and transmits the received audio signal to the audio output unit 370.

On the other hand, the signal input and output unit 380 is connected to an external apparatus and thus is formed in such a manner as to transmit the signal to the image display device 100. The signal input and output unit 380 includes a socket 387 that has an opening in one side thereof. Then, a connection unit of the external apparatus is inserted into the socket 387.

The signal input and output unit 380 is connected by cable or wirelessly to the external apparatus, for example, a digital versatile disk (DVD) player, a Blu-ray disk player, a game apparatus, a camera, a videotape recorder, a notebook computer, a set-top box, a portable device, a smart phone and the like, and performs signal input and output operations. To do this, the signal input and output unit 380 includes an A/V input and output unit for connection to a cable network and a wireless communication unit for connection to a wireless network.

In this case, the signal input and output unit 380 receives a broadcast signal from the external apparatus, transmits the image signal and the audio signal to the image display device 100, receives the audio signal from the image display device 100, and transmits the received audio signal to the audio output unit 370.

On the other hand, the signal input and output unit 380 includes a first wireless communication unit 381 that is formed in such a manner as to receive the audio signal from the image display device 100 wirelessly.

In addition, the signal input and output unit 380 includes a second wireless communication 382 that is formed in such a manner as to transmit the image signal and the audio signal to the image display device 100 wirelessly.

At this point, the signal input and output unit 380 of the image display device receives the signal that is transmitted from the second wireless communication unit 382 of the audio extension module 300, and transmits the audio signal to the first wireless communication unit 381 of the audio extension module 300.

If the signal input and output unit 380 includes the wireless communication unit, the conductive wire line is unnecessary that connects between the image display device 100 and the audio extension module 300. Thus, a structure associated with wiring of the conductive wire lines is unnecessary, and this makes it possible to arrange the image display device 100 in a slim manner. In addition, the image display device 100 can be moved in a more free manner without any limitation of the wiring.

The signal is input from the signal input and output unit 380 into the signal processing unit 385, and the signal processing unit 385 performs signal processing. The signal processing unit 385 performs the signal processing, such as demultiplexing and decoding, on an image signal among input signals, or performs the signal processing, such as demultiplexing and decoding, on an audio signal, similarly the way a controller 170 of the image display device 100 does.

On the other hand, the signal processing unit 385 performs the signal processing and thus outputs the image signal or the audio signal in a predetermined format. For example, the image signal is output as an RGB data signal. The RGB data signal is output, for example, according to a method of transmitting a low voltage differential signaling (LVDS).

Figure 12:
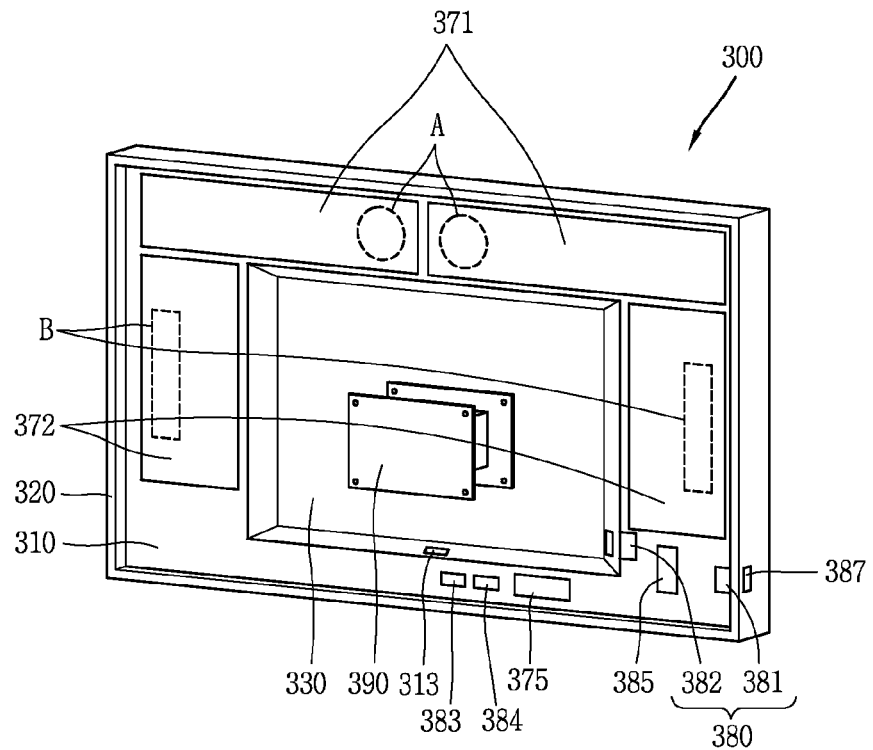
FIG. 12 is a diagram of the audio extension module according to another embodiment of the present invention.
Figure 13:
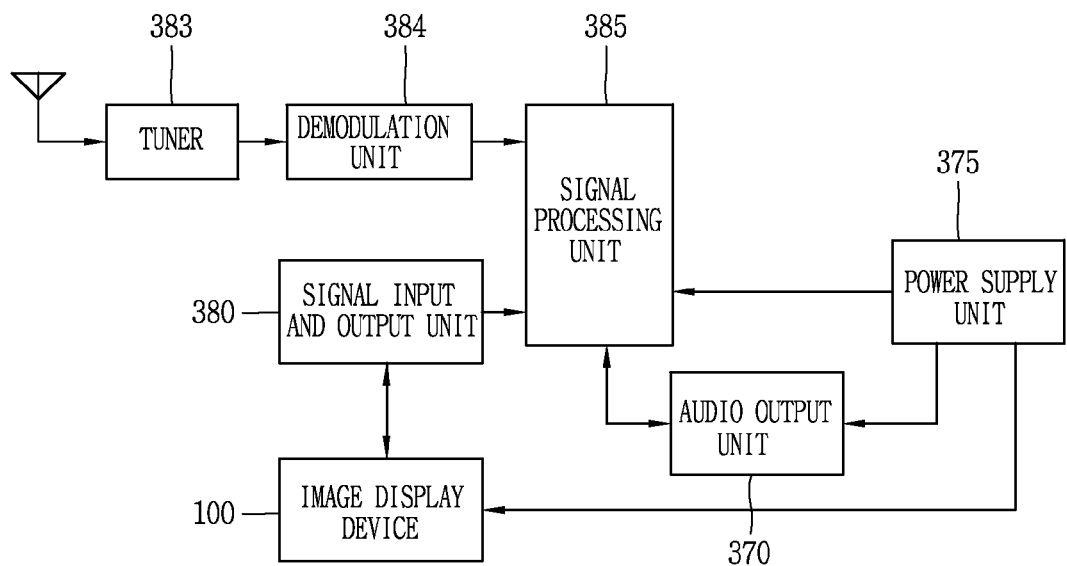
FIG. 13 is a block diagram of the audio extension module illustrated in FIG. 12.

FIG. 12 is a diagram of the audio extension module 300 according to another embodiment of the present invention. FIG. 13 is a block diagram of the audio extension module 300 illustrated in FIG. 12.

Referring to FIG. 12 and FIG. 13, in addition to the power supply unit 375 and the signal input and output unit 380, the audio extension module 300 includes a tuner 383 and a demodulation unit 384.

Referring to FIG. 12, the body 310 of the audio extension module 300 includes the power supply unit 375. The power supply unit 375 is formed in such a manner as to supply electrical power to the audio output unit 370. Then, the audio output unit 370 supplies electrical power not only to the signal input and output unit 380 and the signal processing unit 385, but also to the image display device 100.

In addition, the body 310 includes an amplifier that is formed in such a manner as to increase output power of audio signals.

Furthermore, the tuner 383 and the demodulation unit 384 are also formed in the body 310 of the audio extension module 300. The signal input and output unit 380 is also formed in the body 310 of the audio extension module 300.

In this manner, some of the devices that are built into the image display device 100 are formed in the audio extension module 300, and thus the image display device 100 are formed in a slimmer manner. In addition, devices associated with heat generation within the image display device 100 are arranged in the audio extension module 300, and this solves problems caused by the heat generation.

The signal input and output unit 380 is formed in such a manner as to transmit and receive an image signal and an audio signal to and from the image display device 100. As one example, the signal input and output unit 380 transmits the image signal and the audio signal to the image display device 100, receives the audio signal from the image display device 100, and transmits the received audio signal to the audio output unit 370.

On the other hand, the signal input and output unit 380 is connected to an external apparatus and thus is formed in such a manner as to transmit the signal to the image display device 100. That is, the signal input and output unit 380 is connected by cable or wirelessly to an external apparatus, for example, a digital versatile disk (DVD) player, a Blu-ray disk player, a game apparatus, a camera, a videotape recorder, a notebook computer, a set-top box, a portable device, a smart phone and the like, and performs signal input and output operations. To do this, the signal input and output unit 380 includes the A/V input and output unit for connection to a cable network and the wireless communication unit for connection to a wireless network.

In this case, the signal input and output unit 380 receives a broadcast signal from the external apparatus, transmits the image signal and the audio signal to the image display device 100, receives the audio signal from the image display device 100, and transmits the received audio signal to the audio output unit 370.

On the other hand, the signal input and output unit 380 includes the first wireless communication unit 381 that is formed in such a manner as to receive the audio signal from the image display device 100.

In addition, the signal input and output unit 380 includes the second wireless communication unit 382 that is formed in such a manner as to transmit the image signal and the audio signal to the image display device 100 wirelessly.

If the signal input and output unit 380 includes the wireless communication unit, the conductive wire line is unnecessary that connects between the image display device 100 and the audio extension module 300. Thus, the structure associated with the wiring of the conductive wire lines is unnecessary, and this makes it possible to arrange the image display device 100 in a slim manner. In addition, the image display device 100 can be moved in a more free manner without any limitation of the wiring.

The signal that is output from the signal input and output unit 380 is input into the signal processing unit 385, and the signal processing unit 385 performs the signal processing. The signal processing unit 385 performs the signal processing, such as demultiplexing and decoding, on an image signal among input signals, or performs the signal processing, such as demultiplexing and decoding, on an audio signal, similarly the way a controller 170 of the image display device 100 does.

On the other hand, the signal processing unit 385 performs the signal processing and thus outputs the image signal or the audio signal in a predetermined format. For example, the image signal is output as an RGB data signal. The RGB data signal is output, for example, according to the method of transmitting the low voltage differential signaling (LVDS).

The tuner 110 selects a radio frequency (RF) broadcast signal corresponding to a channel selected by the user, from radio frequency (RF) broadcast signals received through an antenna, and converts the selected RF broadcast signal into an intermediate frequency signal or a baseband video/audio signal. For example, if the RF broadcast signal is a digital broadcast signal, the tuner 110 converts the RF broadcast signal into a digital IF (DIF) signal. In contrast, if the RF broadcast signal is an analog broadcast signal, the tuner 110 converts the RF broadcast signal into an analog baseband image/audio signal (CVBS/SIF). In this manner, the tuner 110 is a hybrid tuner that is capable of processing the digital broadcast signal and the analog broadcast signal.

The digital IF (DIF) signal that is output from the tuner 110 is input into the demodulation unit 384, and the analog baseband image/audio signal (CVBS/SIF) is input into the signal processing unit 385.

The demodulation unit 384 receives the digital IF (DIF) signal that is converted in the tuner 110 and performs demodulation operation on the digital IF (DIF) signal.

If the digital IF (DIF) signal that is output from the tuner 110 is for an ATSC method, the demodulation unit 384 performs 8-vestigial side band (8-VSB). The 8-vestigial side band (8-VSB) demodulation is a demodulation by a vestigial sideband modulation method for a single carrier wave amplitude modulation that uses a National Television System Committee (NTSC) frequency band. At this time, the demodulation unit 384 performs channel decoding, such as Trellis decoding, de-interleaving, and Reed-Solomon decoding. To do this, the demodulation unit 384 includes a Trellis decoder, a de-interleaver, a Reed-Solomon decoder, and the like.

When the digital IF (DIF) signal that is output from the tuner 110 is for a DVB method, the demodulation unit 220 performs coded orthogonal frequency division modulation (COFDMA) modulation. At this point, the demodulation unit 384 performs channel decoding, such as convolution decoding, de-interleaving, and Reed-Solomon decoding. To do this, the demodulation unit 384 includes a convolution decoder, the de-interleaver, the Reed-Solomon decoder, and the like.

The demodulation unit 384 performs the demodulation and the channel decoding in this manner and then outputs a transport stream TS. At this point, the transport stream is a transport stream that results from multiplexing an image signal, an audio signal, or a data signal. For example, the transport stream TS is an MPEG-2 transport stream (TS) that results from multiplexing an MPEG-2 standard image signal, a Dolby AC-2 standard audio signal, and the like. At this point, MPEG-2 TS includes a 4-byte header and a 184-bit payload.

The signal that is output from the demodulation unit 384 in this manner is input into the signal processing unit 385, and demultiplexing, image/audio signal processing, and the like are performed on the signal that is input.

After the demultiplexing, the image/audio signal processing and the like are performed in the signal processing unit 385, the image signal is input through the signal input and output unit 380 into the image display device 100, and the audio signal is input into the audio output unit 370.

Figure 14:
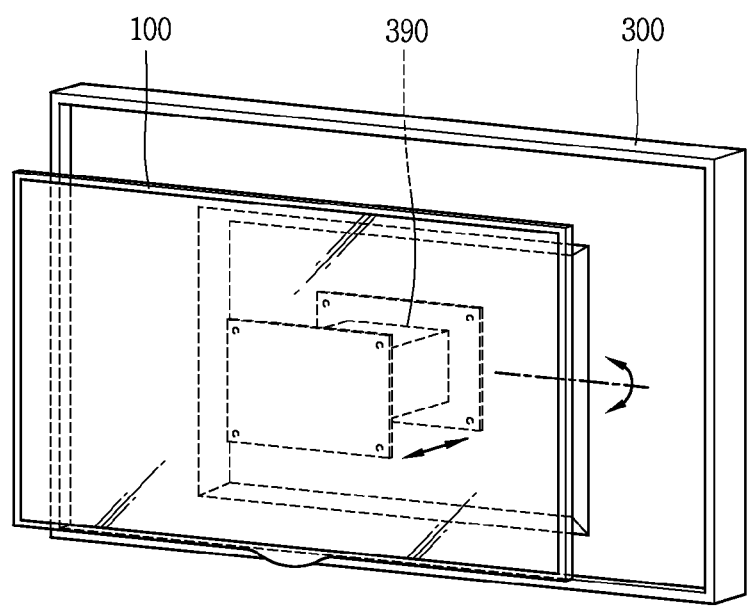
FIG. 14 is a diagram illustrating an example of the image display device that is moved by a combination module.
Figure 15:
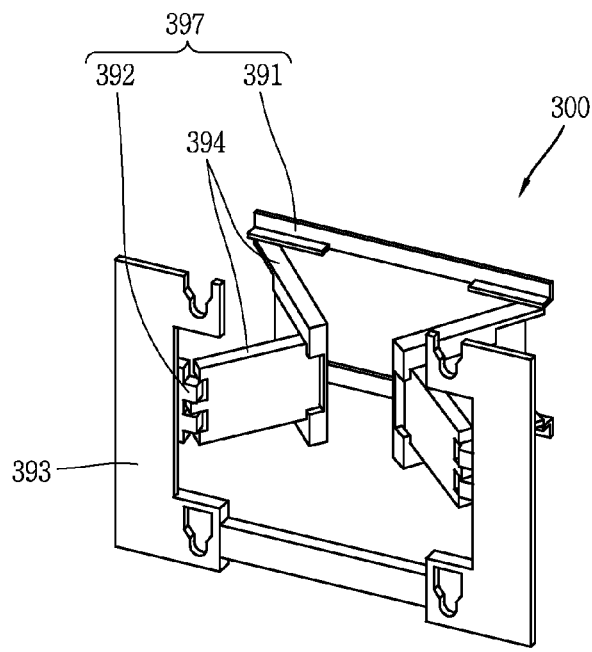
FIG. 15 is a diagram illustrating an example of a separation unit of the combination module.
Figure 16:
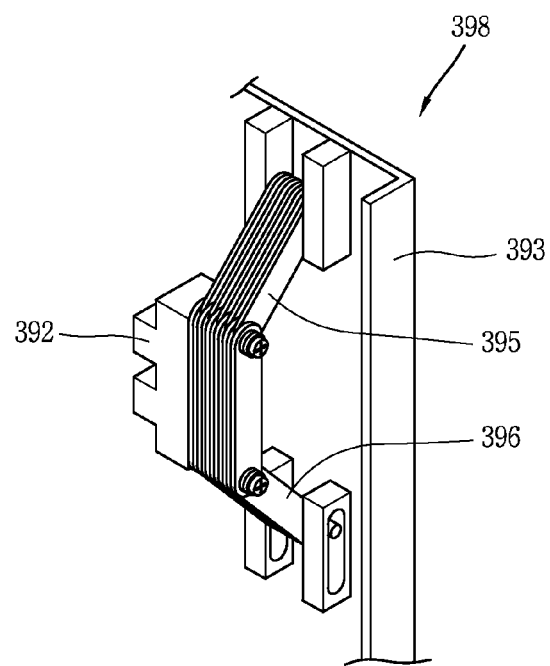
FIG. 16 is a diagram illustrating an example of a tilting unit of the combination module.

FIG. 14 is a diagram illustrating an example of the image display device 100 that is moved by the combination module 390. FIG. 15 is a diagram illustrating an example of a separation unit 397 of the combination module 390. FIG. 16 is a diagram illustrating an example of a tilting unit 398 of the combination module 390.

The combination module 390 is formed in such a manner as to combine the image display device 100 to the wall. The image display device 100 is formed in such a manner that it is moved by the combination module 390 with respect to the combination module 390.

As the image display device 100 moves away from the wall, it moves forwards.

To do this, as illustrated in FIG. 15, the combination module 390 includes the separation unit 397 that separates the image display device 100 away from the wall.

The separation unit 397 is formed by connection of a first combination member and a second combination member by one or more links. At this point, the first combination member is fixed to the wall, and the second combination member is combined with the image display device 100. When the links come close to each other, the image display device 100 is arranged close to the wall, and when the links move away from each other, the image display device 100 is arranged away from the wall.

In addition, the image display device 100 is moved in such a manner that it can tilt with respect to the wall. That is, as illustrated in FIG. 16, the combination module 390 includes the tilting unit 398 that moves the image display device 100 in an inclined manner.

The tilting unit 398 is formed by a combination of a first tilting member, a second tilting member, and the multiple links. At this point, one link comes close to the first tilting member, the other moves away from the first tilting member. Accordingly, the second tilting member is inclined to a given angle.

The separation unit 397 and the tilting unit 398 may be integrated into the combination module 390.

In this case, the combination module 390 includes a first combination member 391, a second combination member 392, a third combination member, and links 394, 395, and 396. A configuration is provided in such a manner that when the links 394 that connects the first combination 391 and the second combination 392 move away from each other or comes close to each other, the first combination member 391 and the second combination member 391 moves away from each other or comes close to each other. The third combination member 393 is inclined to a given angle by movements of the links 395 and 396 that connect the second combination member 392 and the third combination member 393. The third combination member 393 is combined to the image display device 100, and thus when the third combination member 393 is inclined, the image display device 100 tilts.

In this manner, the image display device 100 moves away from the audio extension module 300 or tilts by the combination module 390.

The various embodiments are described above in order to describe original technological ideas associated with various aspects of the present invention. However, one or more distinctive features of one embodiment can be applied to one or more different embodiments. Some of the constituent elements or the steps according to each of the embodiments, which are described referring to drawings, can be modified or adjusted. The constituent elements and/or the steps can be deleted or moved and additional constituents and/or steps can be included in each of the embodiments.

At this point, the various distinctive features and technological idea, which are described above, can be realized as being in the form of software, hardware, firmware, middleware or a combination of the two or more. For example, a program for realizing a method of receiving a stereoscopic image signal in digital broadcast and for realizing a device for receiving the stereoscopic image signal, which is stored in a computer-readable medium (which is executed by a computer, a processor, a controller, or the like), includes one or more program codes and sections that perform various tasks. Similarly, a software tool for realizing the method of receiving the stereoscopic image signal in the digital broadcast and the device for receiving the stereoscopic image signal, which is stored in a computer-readable medium (which is executed by a computer, a process, a controller, or the like) includes some of program codes that perform various tasks.

The audio extension module according to at least one embodiment of the present invention, which is configured as described above, receives the audio signal from the image display device and output the received audio signal, resulting in the audio output of the image display device being amplified.

In addition, the audio extension module is formed in such a manner that the frame is exchangeable, and thus the distinctive external appearance is realized. This preserves the unique aesthetic appeal provides the high-quality external appearance. In addition, the user can switch between the frames that are different in design and thus change the external appearance of the audio extension module.

Some of the devices built into the image display device are formed in the audio extension module, and thus makes the image display device slimmer. In addition, the devices associated with the heat generation within the image display device are arranged in the audio extension module, and this solves the problems caused by the heat generation.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An audio extension module comprising:
   a body that is configured to include a first cover that is covered with an image display device and a second cover that is fixed to a wall, the body having an opening to expose the wall;
   an audio output unit that is configured to be built into the body and that is configured to be formed in such a manner as to receive an audio signal from the image display device and to output sound;
   a frame having a larger size than the image display device that is configured to cover a gap that is formed between the image display device and the body and that is configured to be removably combined with the body in such a manner as to enclose a border of the body; and
   a coupler that extends through the opening of the body to attach to the exposed wall, wherein the image display device is coupled to the coupler, wherein the coupler allows movement of the image display device relative to the wall.

2. The audio extension module of claim 1, wherein the audio output unit includes one or more first speakers that are formed in such a manner as to output a low tone and one or more second speakers that are formed in such a manner as to output a high tone.

3. The audio extension module of claim 2, wherein the first speaker is arranged above or below the opening portion and ti c second speaker is arranged to the left of and to the right of the opening portion.

4. The audio extension module of claim 1, wherein at least one portion of the first cover that covers the audio output unit is made of textile.

5. The audio extension module of claim 1, wherein a hole is formed in one surface of the body that defines the opening portion, and
   wherein a conductive wire line that connects between the body and the image display device passes through the hole.

6. The audio extension module of claim 1, wherein the combination module includes a separation device that is formed in such a manner a to separate the image display device away from the wall.

7. The audio extension module of claim 6 further including a tilting device that is configured to be integrally formed into the separation device and to move the image display device in an inclined manner.

8. The audio extension module of claim 1, wherein the body and the frame are removably combined with each other with a magnet.

9. The audio extension module of claim 1, wherein the body is divided into two or more regions and image display devices are arranged in such a manner as to cover the regions that result from the division.

10. The audio extension module of claim 1, wherein the body further includes a signal input and output device that is configured to be formed in the image display device in such a manner, as to transmit and receive an image signal and an audio signal.

11. The audio extension module of claim 10 further including a first wireless communication device that is configured to be formed in such a manner as to receive the audio signal wirelessly from the image display device.

12. The audio extension module of claim 11 further including a second wireless communication device that is configured to be formed in such a manner as to transmit the image signal and the signal wirelessly to the image display device.

13. The audio extension module of claim 10, wherein the signal input and output device is formed in such a manner as to connect to an external apparatus and transfer a signal to the image display device.

14. The audio extension module of claim 1, wherein the body is combined with the wall in such a manner that the body is able to tilt with respect to the wall.

15. The audio extension module of claim 1, wherein a power supply that is formed in such a manner as to supply electrical power to the image display device is built into the body.

16. The audio extension module of claim 1, wherein the wall is an interior wall.

* * * * *